United States Patent
Sugahara

[15] 3,650,537
[45] Mar. 21, 1972

[54] OIL RING OF ONE PIECE TYPE
[72] Inventor: Eisuke Sugahara, Tokyo, Japan
[73] Assignee: Nippon Piston Ring Co., Ltd., Tokyo, Japan
[22] Filed: Oct. 28, 1970
[21] Appl. No.: 84,696

[52] U.S. Cl. .............................. 277/160, 277/208, 277/216
[51] Int. Cl. ................................................ F16j 9/20
[58] Field of Search ................ 277/138, 139, 140, 200, 201, 277/202, 208, 157, 160, 161, 216, 223, 224; 92/201

[56] References Cited

UNITED STATES PATENTS 3,212,785  10/1965  Hamm .................................. 277/200
3,323,807  6/1967  Vanderbilt ........................... 277/140
3,522,949  8/1970  Wells .................................... 277/140
2,631,908  3/1953  Teetor .................................. 277/200
2,639,205  5/1953  Wilkening et al .................... 277/160

*Primary Examiner*—Robert I. Smith
*Attorney*—Sughrue, Rothwell, Mion, Zinn & Macpeak

[57] ABSTRACT

An oil ring of the one piece type has a chrome plated outer edge periphery, its upper and lower sides are inclined radially outwardly, and an expander is attached to the back thereof having resiliency in the radial direction.

4 Claims, 5 Drawing Figures

Patented March 21, 1972 3,650,537

INVENTOR
EISUKE SUGAHARA

BY *Sughrue, Rothwell Mion, Zinn & Macpeak*

ATTORNEYS

OIL RING OF ONE PIECE TYPE

BACKGROUND OF THE INVENTION

1. Field of the Invention

This invention relates to improvements of oil rings of one piece type.

2. Description of the Prior Art

Heretofore, an oil ring of one piece type is well known as, for example, in U.S. Pat. No. 2,932,543. Such conventional one-piece oil rings are so formed, for example, that a plurality of rectangular oil windows of the same size and spaced equally are continuously provided along the centerline of thin strip steel sheet for passing the oil. Further, slits are formed alternatively from the oil windows to both sides of the steel sheet, respectively and both sides of the strip sheet are bent parallel with the centerline toward the same sides at right angles to form the upper and lower sides having sliding edges, respectively. Thus formed, the oil ring sheet is properly cut, curled, and inserted into groove for use as an oil ring of a piston so that the upper and lower side surfaces of the oil ring contact the groove of the piston and the edges of the same slidingly contact the cylinder wall so as to scrape the excessive oil adhered to the cylinder wall from the wall and pass the oil through the oil windows from the oil hole to the oil pan.

However, since the oil ring of one-piece type is a unit structure, there exists a limitation in the tension thereof, and accordingly the surface pressure to the cylinder wall of the sliding surface becomes insufficient. Further, since the oil ring is bent at approximately right angles in cross section to form an inverse U-shape, the air-tightness between the upper and lower side surfaces of the oil ring and the sidewall of the ring groove of the piston becomes improper. If the oil ring is used in such state, it may be expected not only that the excessive oil adhered to the cylinder wall is properly scraped, but that a pumping action will occur with the result that the oil consumption thereof is increased. The combustion chamber is thus contaminated so that the output of the engine is lowered.

SUMMARY OF THE INVENTION

The present invention eliminates the aforementioned disadvantages of the conventional oil rings, and provides a novel and improved oil ring which effectively scrapes the oil and at the same time improves the wear resistance and mechanical strength of the ring to extend the life thereof.

According to one aspect of the present invention, there is provided a unitary oil ring which comprises a chrome plated outer peripheral edge, upper and lower sides inclined radially outwardly, and an expander attached to the back thereof providing resiliency in radial direction.

According to another aspect of the present invention, the one-piece oil ring employs synthetic resin coated on the upper and lower side surfaces thereof. The oil ring may be also made of stainless steel.

BRIEF DESCRIPTION OF THE DRAWING

The other objects, features and advantages of the present invention will become apparent from the following description taken in conjunction with the accompanying drawings, in which.

DETAILED DESCRIPTION OF THE PRIOR ART

Figure 1:
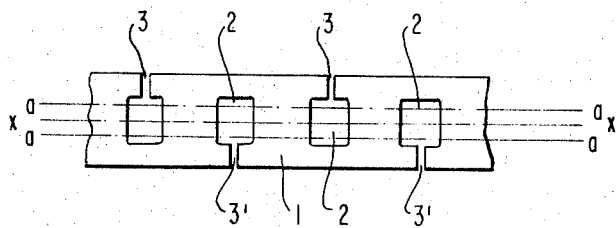
FIG. 1 is a plan view of the conventional oil ring of one-piece type in the state of thin flat steel sheet provided with oil windows and slits in the manufacturing process.
Figure 2:
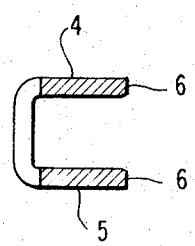
FIG. 2 is a sectional view of the prior art oil ring bent from the steel sheet along the bending lines thereof.
Figure 3:
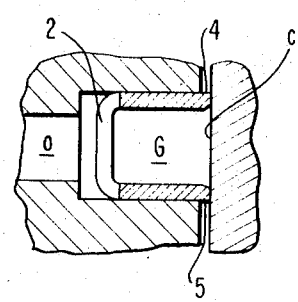
FIG. 3 is a sectional view of an oil ring of FIG. 2 bent into circular shape and inserted into the groove of the piston and engaging the cylinder.

For better understanding of the present invention, the conventional oil ring is described with reference to FIGS. 1, 2 and 3 which show a thin flat steel sheet forming the conventional oil ring. The oil ring has a plurality of rectangular oil windows 2 of the same size and spacing continuously provided along the centerline $x-x$ of thin strip steel sheet 1 for passing the oil. Slits 3, 3' are formed alternatively from the oil windows 2 to the respective sides of the steel sheet 1. Both sides of the strip sheet are bent along a predetermined line $a-a$ in parallel with the centerline $x-x$ and to the same sides at right angles so as to form the upper and lower sides 4 and 5 having sliding edges 6 and 6, respectively. If the thus formed oil ring sheet 1 is properly cut, curved, and inserted into a groove G, FIG. 3, for oil ring of a piston, the upper and lower surfaces 4 and 5 of the upper and lower sides of the oil ring contact the groove of the piston and the outer peripheral edges 6 and 6 of the upper and lower sides of the oil ring slidingly contact the cylinder wall of the cylinder C so as to scrape the excessive oil adhered to the cylinder wall to pass the oil through the oil windows from the oil hole O into the oil pan.

Since this oil ring is made as a unit structure, and is bent at right angle in cross section to form an inverse U-shape, the air-tightness between the upper and lower surfaces of the oil ring and the sidewall of the ring groove of the piston becomes improper as described previously.

Figure 4:
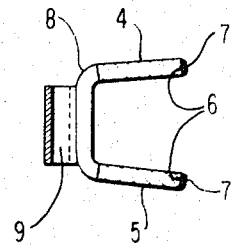
FIG. 4 is a sectional view of the oil ring of the present invention attached to an expander at the back surface thereof.

Reference is now made to the drawings, and particularly to FIG. 4, which shows one embodiment of the present invention. Like elements to the prior art ring carry like numerals. The outer peripheral edges 6 of the oil ring are plated with chrome 7, and the upper and lower surfaces 4 and 5 are so inclined axially outwardly and radially outwardly. A wavy expander 9 having resiliency in the radial direction is fixed to the back surface 8 of the one-piece oil ring. This oil ring is thus formed that chrome plated on the outer peripheral edges 6 of the oil ring slidingly contacts the cylinder wall and has good wear resistance. As this oil ring's sides are also inclined axially outwardly and radially outwardly, the air-tightness between the oil ring and the sidewalls G of the ring groove of the piston is properly maintained. Pumping action may be prevented so that the oil consumption may be lowered. In addition, the combustion chamber is not contaminated so that the power of the engine is improved. Further, since the wavy expander has resiliency in radial direction and is assembled to the back surface 8 of the oil ring, the tension of the oil ring is increased so that the surface pressure of the sliding edge surfaces on the cylinder wall is high with the result that the scraping effect of the oil ring is improved. Accordingly, the scraped oil is quickly returned to the oil pan and lubricant oil consumption is prevented.

Figure 5:
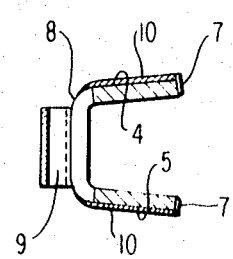
FIG. 5 is a sectional view of another embodiment of the oil ring of this invention.

Referring now to FIG. 5, which shows another embodiment of this invention, a synthetic resin 10 is coated on the upper and lower side surfaces 4 and 5 of the oil ring of one-piece type. In this case, using synthetic resin may preferably be pf polytetrafluoroethylene resin in consideration with the thermal point and strength. Since the synthetic resin having low friction coefficient is coated on the upper and lower surfaces 4 and 5 of the oil ring of one-piece type, the decrease of the tension of the oil ring due to the frictional contact with the sidewalls G of the piston ring groove, FIG. 3, of the upper and lower surfaces 4 and 5 thereof as in the conventional ones may be perfectly removed, so that the resiliency in radial direction of the oil ring is not compromised with the result that high edge surface pressure may be obtained. Accordingly, if the first and second embodiment of the present invention are combined to be used, the oil scraping effect may be further increased.

In a further embodiment of the oil ring of one-piece type of this invention, stainless steel such as, for example, 17-7PH is used as strip or sheet material. Since this embodiment uses the stainless steel, the mechanical strength of the oil ring may be improved. As described before, the structure of the conventional oil ring of one-piece type is a unit structure, the tension thereof is restricted. Since this embodiment uses stainless steel, the mechanical strength of the oil ring of one-piece type is improved and the oil ring itself has sufficient resiliency so that the defects of the oil ring are prevented. Furthermore, the tension of the oil ring may be increased so that the surface pressure of the sliding surface of the oil ring to the cylinder wall may be raised. If this embodiment is combined with the first and second embodiments, the effects of this invention will be further improved.

One example of the alloy contents of the components of stainless steel 17-7PH used in this invention are the following:

| | |
|---|---|
| C | 0.09 |
| Cr | 16-18 |
| Ni | 6.50-7.75 |
| Al | 0.75-1.25 |
| Si | 1.00 |
| Mg | 1.00 |
| P | 0.04 |
| S | 0.03 |
| Fe | Rest |

What is claimed is:

1. In combination: a one-piece oil ring, said oil ring being of inverse U-shape and having chrome plated outer peripheral side edges, upper and lower sides inclined axially and radially outwardly, and an expander attached to the back thereof and having resiliency in the radial direction.

2. The oil ring as set forth in claim 1, further including a synthetic resin coating on the upper and lower surfaces of respective sides thereof.

3. The oil ring as set forth in claim 1, wherein said ring is made of stainless steel.

4. The oil ring as set forth in claim 2 wherein said ring is made of stainless steel.

\* \* \* \* \*